J. GULDEN.

Soldering Apparatus.

No. 129,473. Patented July 16, 1872.

Witnesses:
Chas. Nida
N. A. Graham

Inventor:
J. Gulden
PER
Attorneys.

UNITED STATES PATENT OFFICE.

JACOB GULDEN, OF KEYPORT, NEW JERSEY.

IMPROVEMENT IN SOLDERING APPARATUS.

Specification forming part of Letters Patent No. 129,473, dated July 16, 1872.

Specification describing a new and Improved Soldering Apparatus, invented by JACOB GULDEN, of Keyport, in the county of Monmouth and State of New Jersey.

Figure 1:
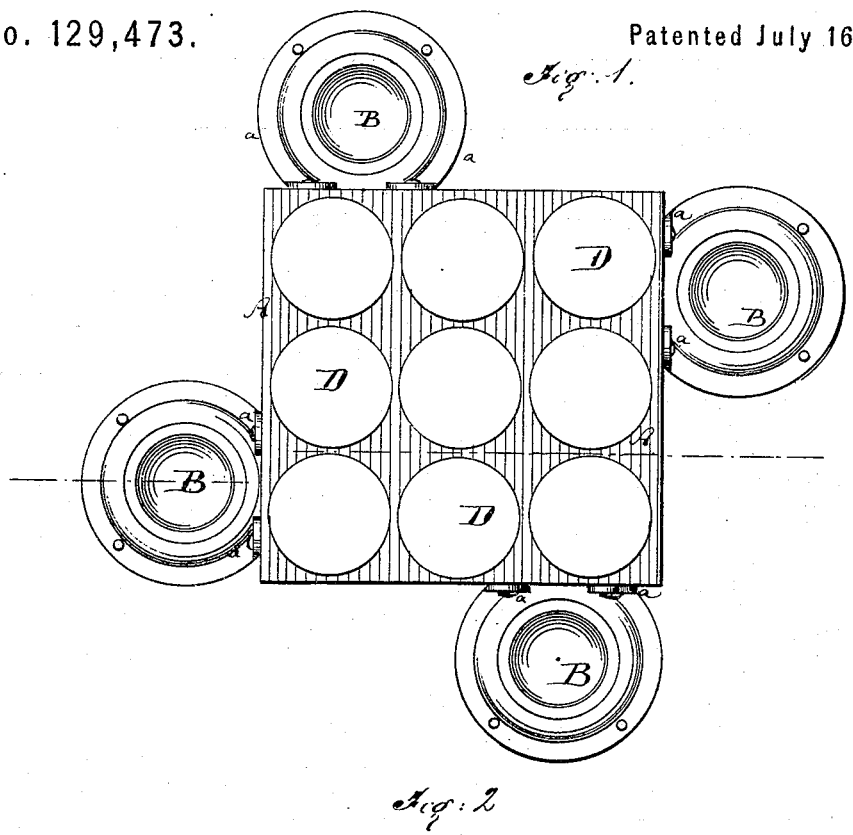
Figure 2:
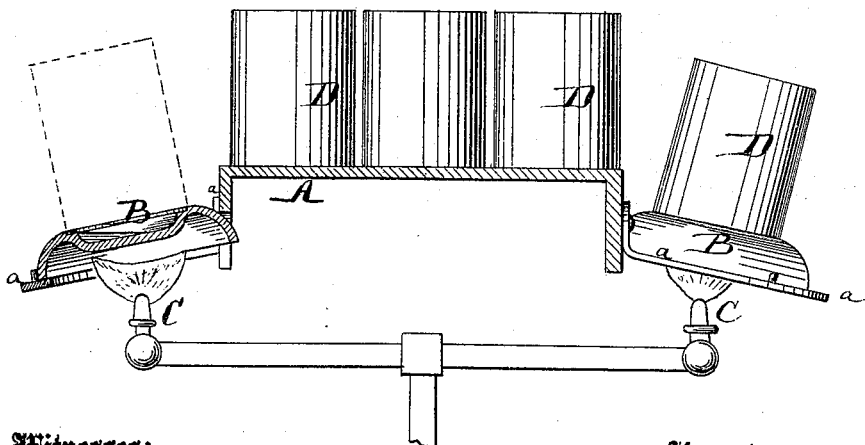

Figure 1 is a top view, and Fig. 2 a vertical sectional view of my improved soldering apparatus.

Similar letters of reference indicate corresponding parts.

This invention relates to a new apparatus for soldering the bottoms of tin cans to the sides of the same, and more particularly to the application to such an apparatus of the heat from gas flames, so that the process can be rapidly carried on by hand. The invention consists in the application to a metallic table of inclined soldering-platforms having circular recesses, and made of metal, to be heated by gas flames from beneath.

A in the drawing represents a table of iron or other metal, made of suitable extent. B B are four, more or less, platforms, of circular or other suitable shape, applied against the sides of the table A by means of metallic hoops $a$ $a$, or by other suitable means; the hoops, if used, being screwed or riveted to the sides of the table A. Each platform B is provided with a circular recess on its upper surface, and is, in cross-section, shaped like an inverted bowl, as appears more fully from Fig. 2. A gas flame, from a suitable burner, C, is applied beneath each platform and heats the same and the solder, which is put into its central recess.

Owing to the inclination of the platform the solder flows to the lower edge of the recess, as indicated on the left of Fig. 2, and is thus in position for contact with the can. The cans D D to be soldered are first placed upon the table A, which, being in metallic contact with the heated platforms B B becomes heated by them and forewarms the cans so that they will quickly take up the solder. The cans are taken from the table and placed upon the recessed platforms, and turned by hand thereon so that they will take up as much solder as required to properly close them.

The recess in the platform is of a size to correspond with the diameter of the cans to be soldered. When that is changed the platforms are replaced accordingly.

Having thus described my invention, I claim as new and desire to secure by Letters Patent—

The metallic table A provided with the inclined recessed platforms B B, which are heated by gas from below, substantially as herein shown and described.

JACOB GULDEN.

Witnesses:
T. B. MOSHER,
W. A. GRAHAM.